(12) United States Patent
Meyer et al.

(10) Patent No.: US 10,377,369 B2
(45) Date of Patent: Aug. 13, 2019

(54) METHODS AND SYSTEM FOR PREDICTING DRIVELINE DISCONNECT CLUTCH TORQUE

(71) Applicant: Ford Global Technologies, LLC, Dearborn, MI (US)

(72) Inventors: Jason Meyer, Canton, MI (US); Rajit Johri, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 15/838,742

(22) Filed: Dec. 12, 2017

(65) Prior Publication Data
US 2019/0176809 A1   Jun. 13, 2019

(51) Int. Cl.
*B60W 20/40* (2016.01)
*B60W 10/113* (2012.01)
*B60W 50/00* (2006.01)

(52) U.S. Cl.
CPC .......... *B60W 20/40* (2013.01); *B60W 10/113* (2013.01); *B60W 2050/0005* (2013.01); *B60W 2510/0241* (2013.01); *B60W 2510/0275* (2013.01); *B60W 2510/0657* (2013.01); *B60W 2510/083* (2013.01)

(58) Field of Classification Search
None
See application file for complete search history.

(56) References Cited

U.S. PATENT DOCUMENTS

| | | | | |
|---|---|---|---|---|
| 6,364,807 | B1* | 4/2002 | Koneda | B60K 6/48 477/5 |
| 7,100,720 | B2* | 9/2006 | Ishikawa | B60K 6/485 180/65.26 |
| 7,784,575 | B2* | 8/2010 | Yamanaka | B60K 6/48 180/65.275 |
| 8,204,656 | B2* | 6/2012 | Heap | B60K 6/365 701/51 |
| 8,452,469 | B2* | 5/2013 | Otokawa | B60K 6/365 701/22 |
| 8,989,930 | B2* | 3/2015 | Sah | B60K 6/387 701/22 |
| 9,061,681 | B2* | 6/2015 | Yoshida | B60K 6/48 |
| 9,162,683 | B2* | 10/2015 | Kim | F02N 11/108 |
| 9,260,002 | B2* | 2/2016 | Tulpule | B60K 6/442 |
| 9,834,201 | B2* | 12/2017 | Inoue | B60K 6/48 |
| 2012/0083385 | A1 | 4/2012 | Smith et al. | |
| 2012/0083952 | A1 | 4/2012 | Smith et al. | |
| 2012/0323418 | A1 | 12/2012 | Sah et al. | |
| 2015/0274147 | A1* | 10/2015 | Nefcy | B60W 10/08 477/5 |

\* cited by examiner

*Primary Examiner* — Dirk Wright
(74) *Attorney, Agent, or Firm* — David Kelley; McCoy Russell LLP

(57) ABSTRACT

Systems and methods for operating a hybrid powertrain that includes an engine and a motor/generator are described. The systems and methods provide a way of estimating driveline disconnect clutch torque so that driveline torque disturbances may be reduced. In one example, driveline disconnect clutch torque capacity and engine torque may be a basis for estimating driveline disconnect clutch torque.

20 Claims, 7 Drawing Sheets

METHODS AND SYSTEM FOR PREDICTING DRIVELINE DISCONNECT CLUTCH TORQUE

FIELD

The present description relates to methods and a system for operating a powertrain of a hybrid vehicle. The methods and systems may be particularly useful for hybrid vehicles that include a driveline disconnect clutch.

BACKGROUND AND SUMMARY

A hybrid vehicle may include a plurality of controllers to operate the vehicle's driveline. For example, the hybrid vehicle may include a vehicle system controller, an engine controller, a transmission controller, an electric machine controller, and a brake controller. The vehicle system controller may request torque responsive to a driver demand torque. The requested torque may be distributed between torque provided via an engine and torque provided via an electric machine. The vehicle system controller may communicate an engine torque request to an engine controller. Further, the vehicle system controller may communicate an electric machine request to an electric machine controller. The engine torque request and the electric machine torque request may be broadcast over a controller area network (CAN), and communication via the CAN may delay the torque requests from reaching the distributed controllers. As a result, the torque delivered via the engine and the electric machine may not accurately track the requested engine and electric machine torque.

Some hybrid vehicle drivelines may include a driveline disconnect clutch for mechanically coupling an engine to an electric machine. The driveline disconnect may transition from an open state to a closed state during engine starting or during periods when the engine is operated at idle speed while the electric machine is propelling the vehicle without assistance from the engine. The engine may be started and accelerated toward speed of an electric machine that is propelling the hybrid vehicle via closing the driveline disconnect clutch. Closing the driveline disconnect clutch may increase a load that is applied to the electric machine, and increasing the load on the electric machine may slow the vehicle and create a driveline torque disturbance if torque of the electric machine is not compensated. However, even if torque of the electric machine is compensated, driveline torque disturbances may occur due to communicating torque requests via the CAN. Therefore, it may be desirable to provide a way of compensating for driveline disconnect clutch torque in vehicle systems where torque requests may be communicated to different controllers.

The inventors herein have recognized the above-mentioned issues and have developed a vehicle system, comprising: an electric machine; an engine; a driveline disconnect clutch mechanically coupled to the engine and the electric machine; and one or more controllers including executable instructions stored in non-transitory memory to adjust an engine torque actuator responsive to driveline disconnect clutch torque, the driveline disconnect clutch torque based on an engine torque and driveline disconnect clutch torque capacity.

By estimating driveline disconnect clutch torque responsive to engine torque and driveline disconnect clutch torque capacity, it may be possible to provide a predicted value of driveline disconnect clutch torque. In particular, the inventors herein have recognized that a prediction of driveline disconnect clutch torque may be provided responsive to driveline disconnect clutch torque capacity, engine torque, and driveline disconnect clutch slip. The prediction is based on a recognition that driveline disconnect clutch torque may transition from a driveline disconnect clutch torque capacity to an engine torque. The blending of driveline disconnect clutch torque capacity and engine torque helps time align electric machine compensation torque with a physical step change in actual driveline clutch torque so that CAN communication delays may be compensated and so that actual engine torque may be adjusted to provide smooth driveline torque progression.

The present description may provide several advantages. Specifically, the approach may provide an improved prediction of driveline disconnect clutch torque so that driveline torque compensation may be improved. Further, the approach may be provided without additional engine sensors or actuators. Further still, the approach may improve engine starting while a vehicle is being propelled via an electric machine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
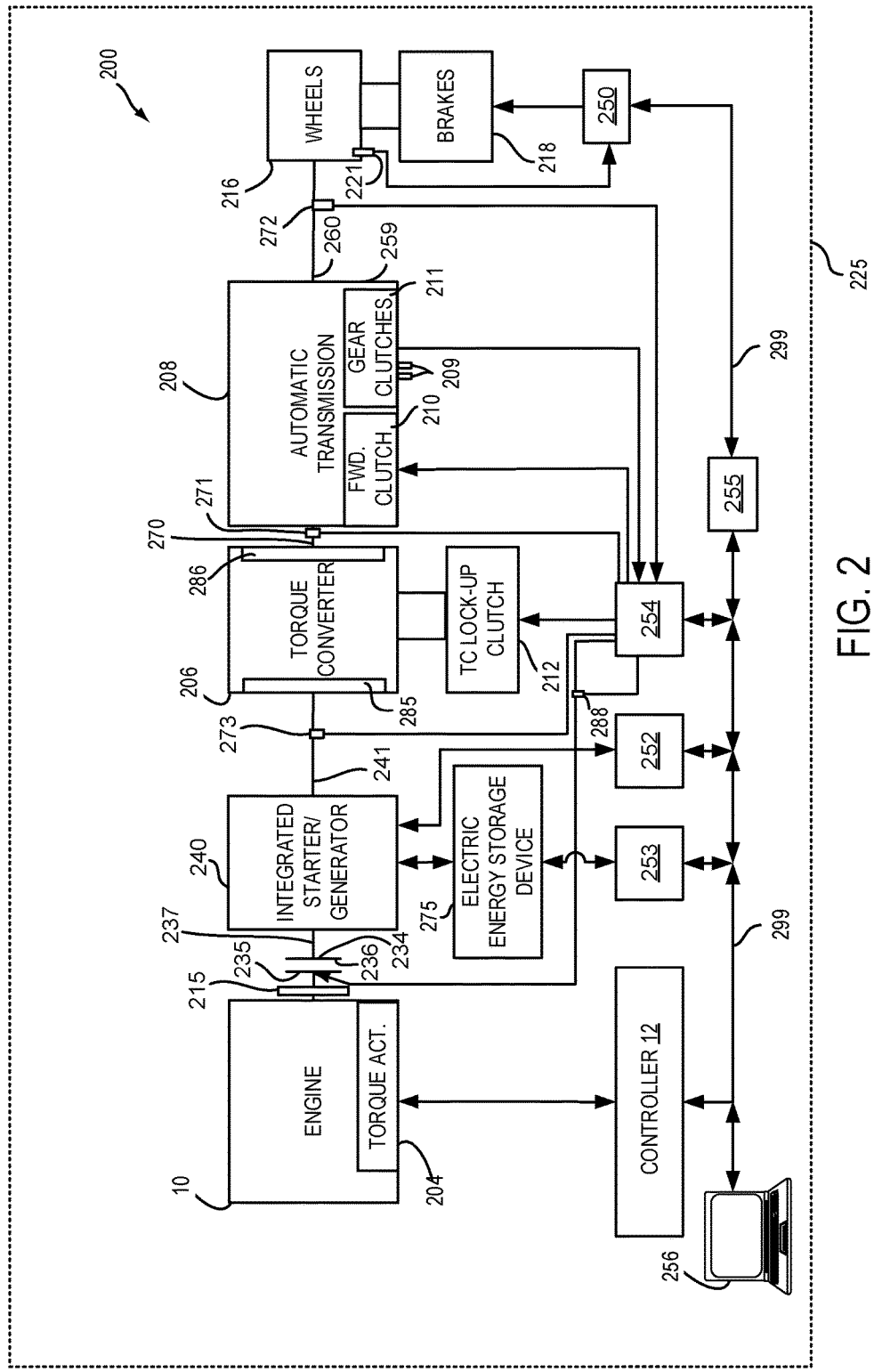
FIG. 2 is a schematic diagram of a hybrid vehicle powertrain.
Figure 3:
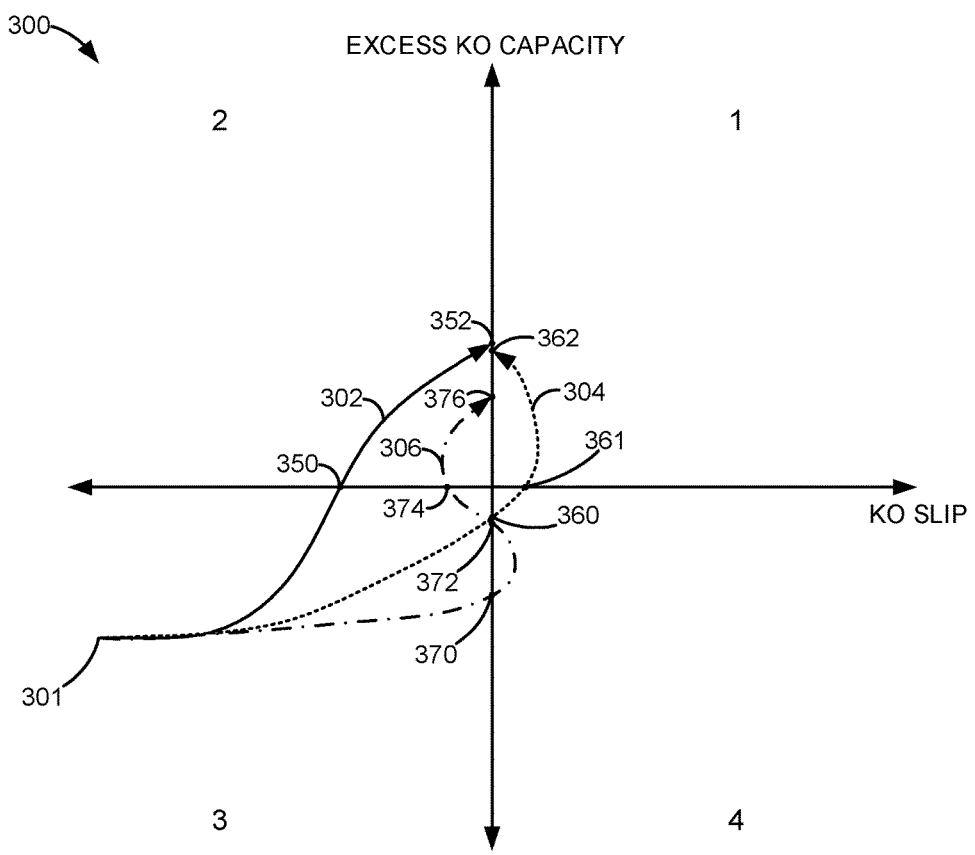
FIG. 3 is a plot that shows example driveline disconnect clutch locking profiles.
Figure 4:
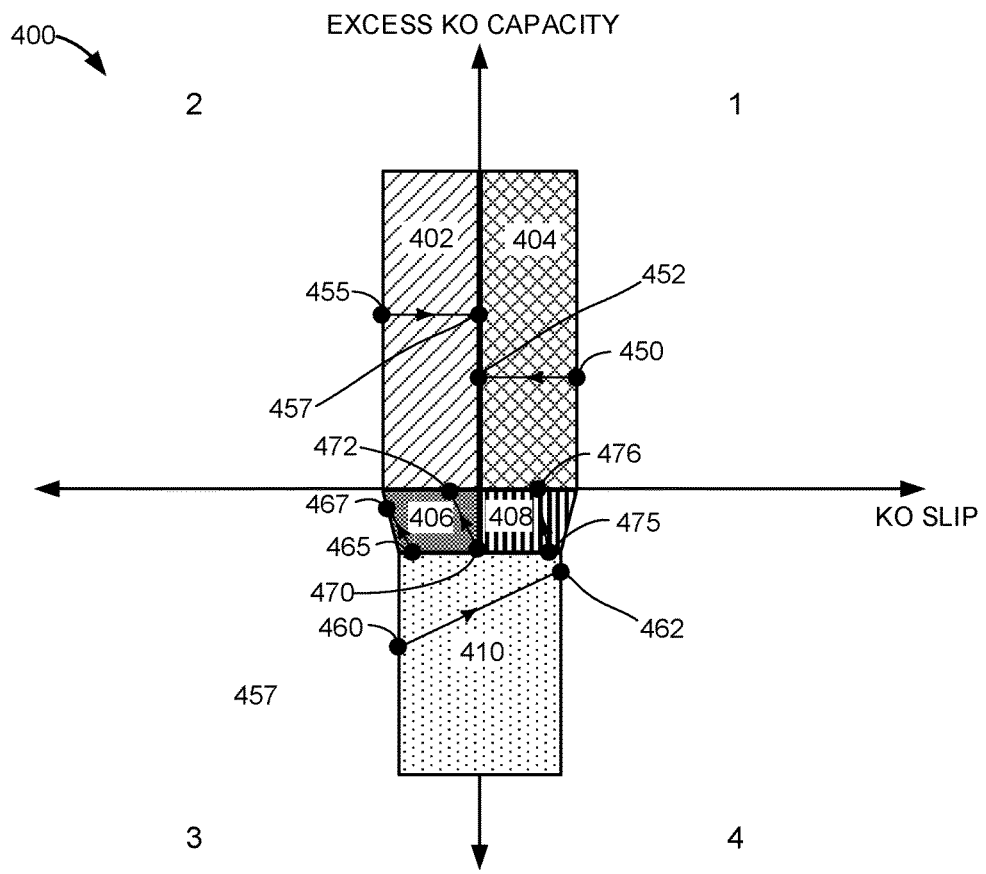
FIG. 4 is a plot showing example driveline disconnect clutch torque estimation zones.
Figure 5:
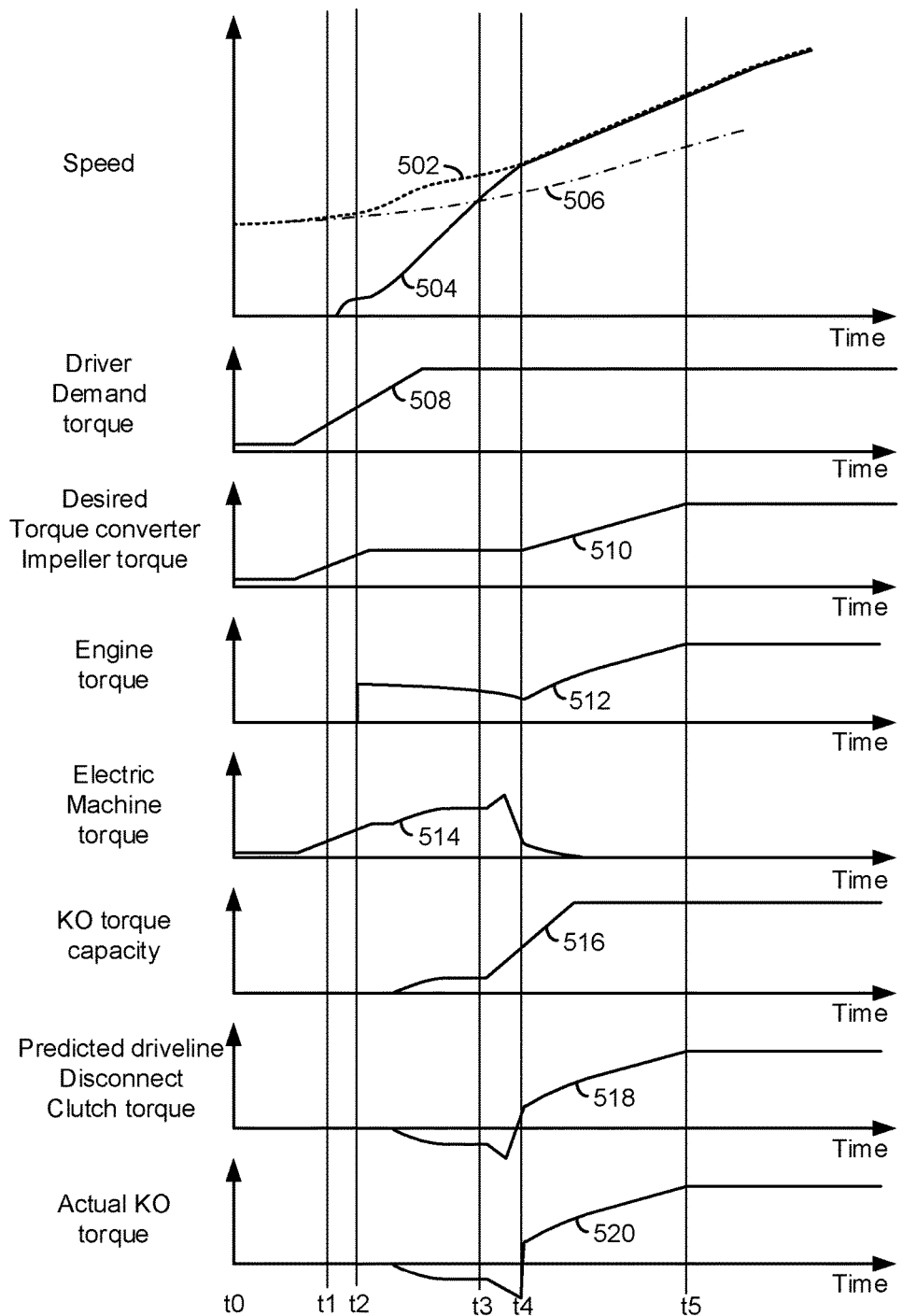
FIGS. 5 and 6 show example driveline disconnect clutch torque prediction sequences.
Figure 6:
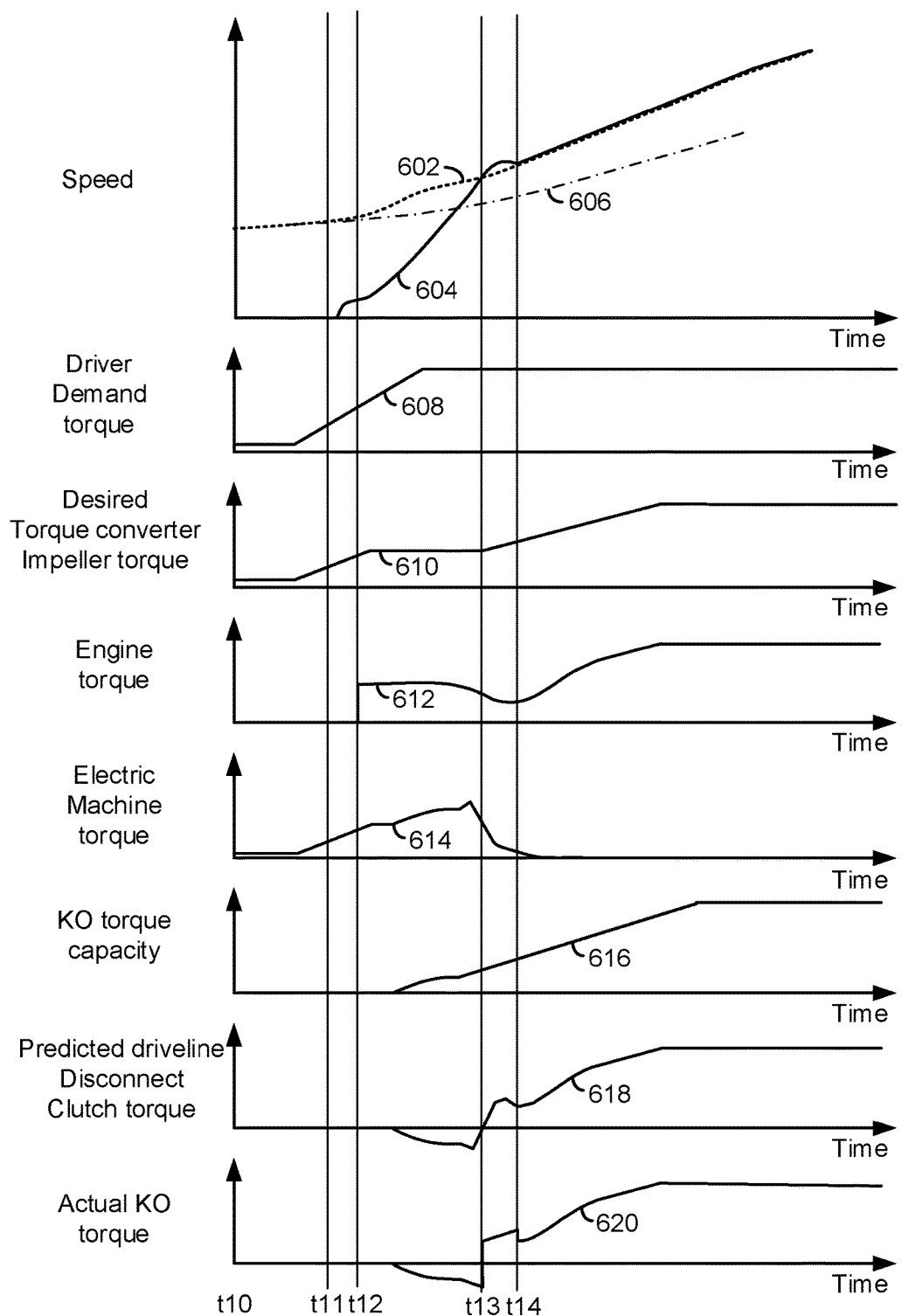
Figure 7:
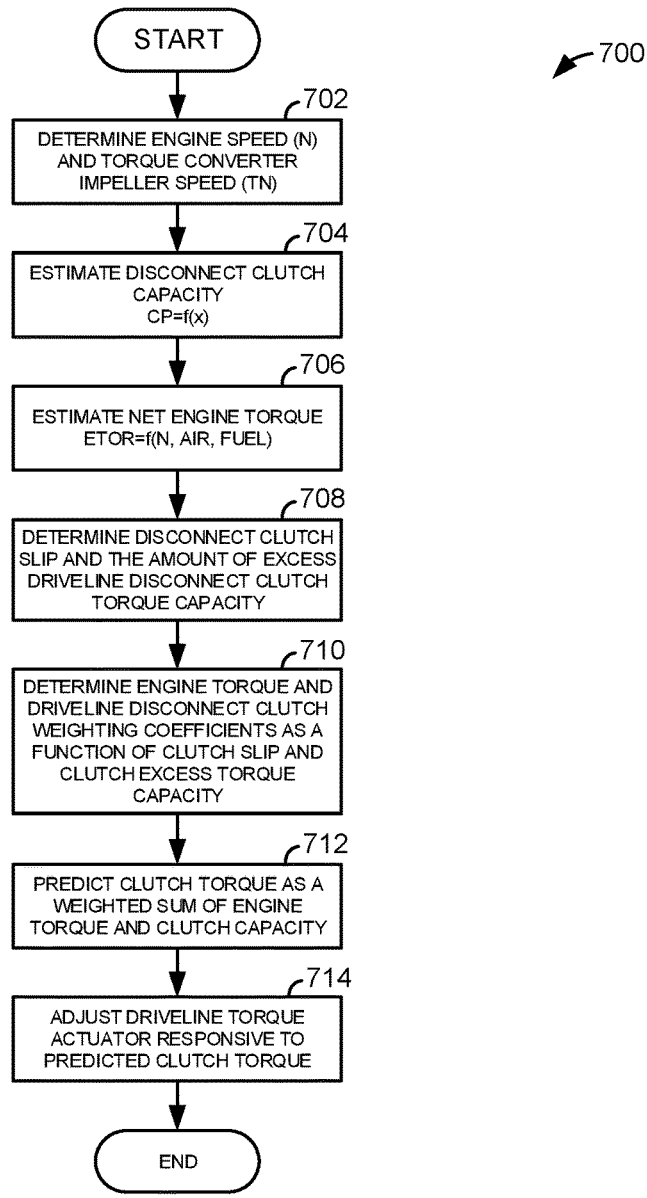
FIG. 7 shows an example flowchart of a method for predicting driveline disconnect clutch torque and operating a vehicle driveline.

The present description is related to predicting driveline disconnect clutch torque to improve driveline torque compensation. A driveline disconnect clutch may be closed during engine starting or after an engine enters a sailing mode to enable greater driveline torque production, provide engine braking, facilitate battery charging, or for other reasons. The engine may be of the type described in FIG. 1 or a diesel engine. The engine may be included in a hybrid vehicle driveline as is shown in FIG. 2. The driveline disconnect clutch may lock during different conditions as is shown in FIG. 3. Driveline disconnect clutch torque may be predicted according to different driveline disconnect clutch operating regions or zones as shown in FIG. 4. FIGS. 5 and 6 show two different engine starts that include closing a driveline disconnect clutch. A method for estimating driveline disconnect clutch torque and operating a driveline is shown in FIG. 7.

Figure 1:
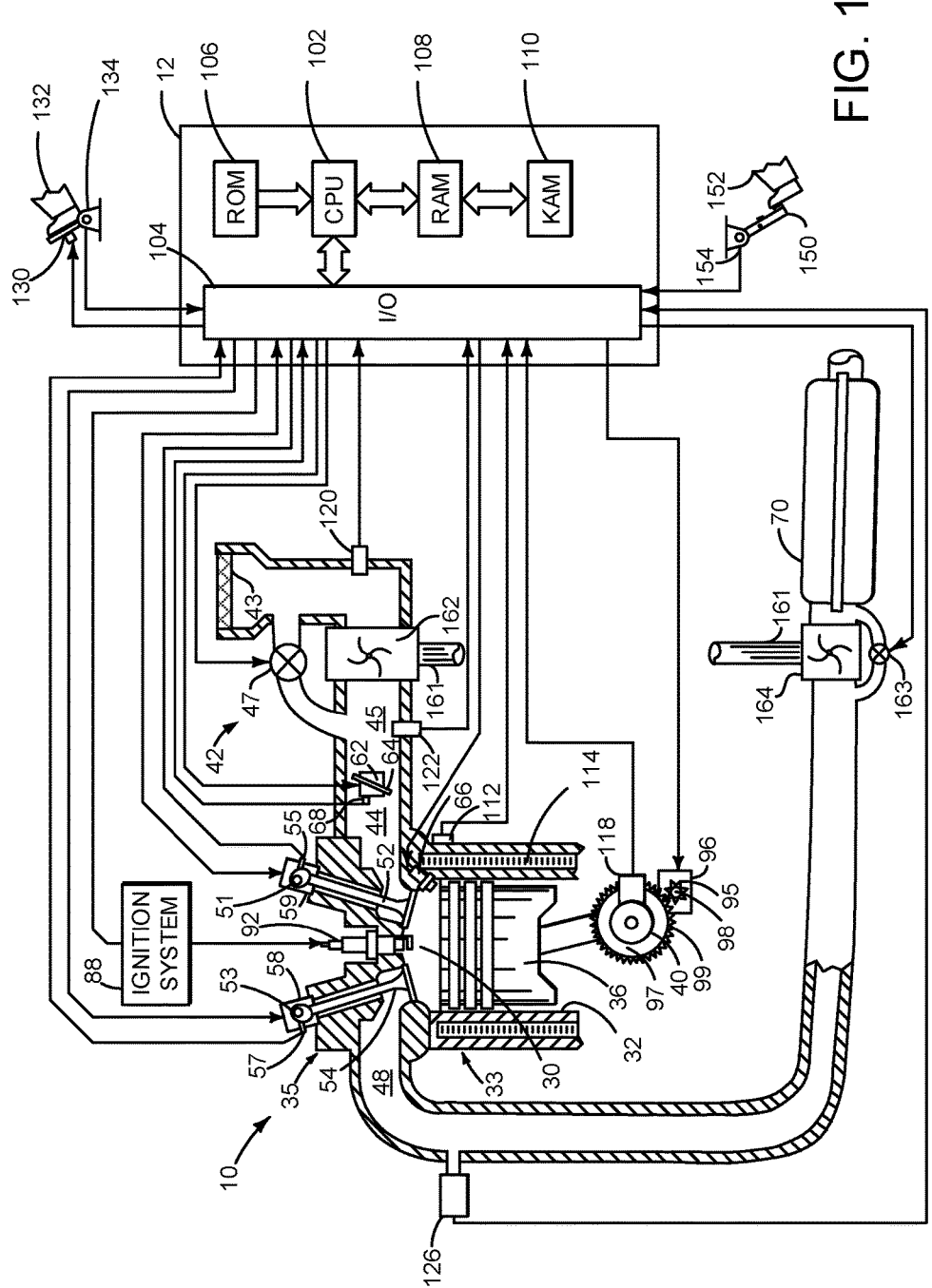
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. Engine speed at sensor 118 is equal to speed of first side 235 of driveline disconnect clutch 236 shown in FIG. 2. Force applied to close driveline disconnect clutch 236 may be estimated via sensor 288. Sensor 288 may be a current sensor, pressure sensor, or position sensor depending on the type of force that is applied to close driveline disconnect clutch 236.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), sensor and actuator data, diagnostic information (e.g., information regarding a degraded transmission, information regarding a degraded engine, information regarding a degraded electric machine, information regarding degraded brakes). Further, the vehicle system controller may provide commands to engine controller 12, electric machine controller 252, transmission controller 254, and brake controller 250 to achieve driver input requests and other requests that are based on vehicle operating conditions. Status information may be provided to a driver via human/machine interface 256 (e.g., keyboard and display).

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, powertrain control devices may be partitioned differently than is shown in FIG. 2. For example, a single controller may take the place of vehicle system controller 255, engine controller 12, electric machine controller 252, transmission controller 254, and brake controller 250.

In this example, powertrain 200 may be powered by engine 10 and electric machine 240. Engine 10 may be started with an engine starting system shown in FIG. 1 or via integrated starter/generator (ISG) 240. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. Speed sensor 273 senses torque converter impeller speed, which is equal to speed of the second side 234 of driveline disconnect clutch 236. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position or torque converter turbine speed via position sensor 271. Transmission controller 254 may convert transmission input shaft position into input shaft speed via differentiating a signal from position sensor 271 or counting a number of known angular distance pulses over a predetermined time interval.

Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Thus, the system of FIGS. 1 and 2 provides for a vehicle system, comprising: an electric machine; an engine; a driveline disconnect clutch mechanically coupled to the engine and the electric machine; and one or more controllers including executable instructions stored in non-transitory memory to adjust an engine torque actuator responsive to driveline disconnect clutch torque, the driveline disconnect clutch torque based on an engine torque and driveline disconnect clutch torque capacity. The system includes where the driveline disconnect clutch is positioned in a driveline between the engine and the electric machine. The system further comprises a fixed ratio transmission, the fixed ratio transmission positioned in the driveline downstream of the electric machine. The system further comprises additional instructions to adjusting a first weighting factor and a second weighting factor responsive to a plurality of zones of a driveline disconnect clutch capacity versus driveline disconnect clutch slip map. The system includes where the plurality of zones includes nine zones. The system includes where the torque actuator is the electric machine.

Referring now to FIG. 3, plot showing example prophetic driveline disconnect clutch locking profiles is shown. A driveline disconnect clutch excess torque capacity versus driveline disconnect clutch slip map 300 includes a horizontal axis, a vertical axis, and four quadrants labeled 1-4. The horizontal axis represent driveline disconnect clutch (e.g., KO clutch) slip (e.g., a speed difference between a first side of the driveline disconnect clutch and a second side of the driveline disconnect clutch). Positive driveline disconnect clutch slip applies to the first and fourth quadrants where speed of the side of the driveline disconnect clutch that is coupled to the engine (e.g., a first side of the disconnect clutch) is greater than speed of the side of the driveline disconnect clutch that is coupled to the electric machine and the torque converter impeller (e.g., second side of the disconnect clutch). Negative driveline disconnect clutch slip applies to the second and third quadrants where speed of the side of the driveline disconnect clutch that is coupled to the engine is less than speed of the side of the driveline disconnect clutch that is coupled to the electric machine and the torque converter impeller.

The vertical axis represents excess driveline disconnect clutch torque capacity (e.g., excess driveline disconnect clutch may be equal to driveline disconnect clutch torque capacity minus engine torque). Positive excess driveline disconnect clutch torque capacity applies to the first and second quadrants where driveline disconnect clutch torque capacity exceeds engine torque. Negative excess driveline disconnect clutch torque capacity applies to the third and fourth quadrants where driveline disconnect clutch torque capacity is less than engine torque.

A first driveline disconnect clutch locking profile or trajectory is indicated via curve 302. In this example, curve 302 represents a driveline disconnect clutch locking profile during a ramp engine start where the driveline disconnect clutch locks as soon as engine speed reaches torque converter impeller speed. Initially, curve 302 begins in the third quadrant at 301 where driveline disconnect clutch slip is negative and excess driveline disconnect clutch torque capacity is negative. For example, the clutch capacity might be zero and the engine torque might be positive. Curve 302 passes through the horizontal axis at 350 and then the driveline disconnect clutch locks at 352 when slip is zero (e.g., at the vertical axis location along the horizontal axis) and when the driveline disconnect clutch torque capacity is greater than engine torque.

A second driveline disconnect clutch locking profile or trajectory is indicated via curve 304. In this example, curve 304 represents a driveline disconnect clutch locking profile during a high urgency ramp engine start where a high engine torque is maintained throughout an engine start. Curve 304 begins in the third quadrant at 301 where driveline disconnect clutch slip is negative and the excess driveline disconnect clutch torque capacity is negative. Curve 304 passes through the horizontal axis at 360 and then it passes through the horizontal axis at 361. The engine speed equals torque converter impeller speed and the engine torque exceeds the driveline disconnect clutch torque capacity at 360 so the driveline disconnect clutch does not lock. The engine torque is equal to the driveline disconnect clutch torque capacity and the engine speed is greater than torque converter impeller speed at 361 so the driveline disconnect clutch does not lock. The driveline disconnect clutch locks at 362 where driveline disconnect clutch torque capacity exceeds engine torque and driveline disconnect clutch slip is zero.

A third driveline disconnect clutch locking profile or trajectory is indicated via curve 306. In this example, curve 306 represents a driveline disconnect clutch locking profile during a high urgency ramp engine start when a transmission gear downshift occurs. Curve 306 begins in the third quadrant at 301 where driveline disconnect clutch slip is negative and driveline disconnect clutch torque capacity is negative. Curve 306 first passes through the horizontal axis at 370 where engine speed equals torque converter impeller speed and where driveline disconnect clutch torque capacity is less than engine torque. Consequently, the driveline disconnect clutch does not lock. The torque capacity of the driveline disconnect clutch continues to increase, but the engine speed increases due to a downshift. The driveline disconnect clutch slip reaches zero a second time at 372, but the driveline disconnect clutch is not locked because the driveline disconnect clutch torque capacity is less than engine torque. The driveline disconnect clutch torque capacity equals engine torque at 374, but engine speed is less than torque converter impeller speed so the driveline disconnect clutch remains unlocked. The engine speed is equal to the torque converter impeller speed at 376 and the driveline disconnect clutch torque capacity exceeds the engine torque so the driveline disconnect clutch locks.

Thus, a driveline disconnect clutch may move along different excess torque capacity and slip trajectories depending on engine starting strategies and initial conditions. However, for the driveline disconnect clutch to lock, it must lock at a location along a vertical axis of the driveline disconnect clutch excess torque capacity versus driveline disconnect clutch slip map that is above the horizontal axis. In other words, the driveline disconnect clutch torque capacity must be greater than present engine torque and engine speed must be within a threshold speed of torque converter impeller speed for the driveline disconnect clutch to lock. The estimate or prediction of driveline disconnect clutch torque may be determined in different ways responsive to driveline disconnect clutch excess torque capacity and driveline disconnect clutch slip as discussed in the description of FIG. 4 so that an improved prediction of driveline disconnect clutch torque may be provided.

Referring now to FIG. 4, an example plot showing example driveline disconnect clutch torque prediction zones within a driveline disconnect clutch excess torque capacity versus driveline disconnect clutch slip map 400 is shown. The quadrants and axis of driveline disconnect clutch excess torque capacity versus driveline disconnect clutch slip map 400 are the same as shown in FIG. 3. Therefore, for the sake of brevity, there description is not repeated here.

Disconnect clutch excess torque capacity versus driveline disconnect clutch slip map 400 includes nine regions or zones, but a greater or less number of zones may be provided. The first zone is the unshaded area of quadrant one. The second zone is the unshaded area of quadrant two. The third zone is the unshaded area of quadrant three. The fourth zone is the unshaded area of quadrant four. The fifth zone is identified as shaded area 410. The sixth zone is identified as shaded area 406. The seventh zone is identified as shaded are 408. The eighth zone is identified as shaded area 402. The ninth zone is identified as shaded are 404. Each of the zones may be described relative to values along the horizontal and vertical axes. The zones are used to describe how weighting coefficients applied to engine torque and driveline disconnect torque capacity may be adjusted to determine driveline disconnect clutch torque. In one example, a weighting coefficient applied to engine torque is designated $\alpha_1$ and the weighting coefficient applied to driveline disconnect clutch torque capacity is designated $\beta_1$. The value of coefficient $\alpha_1$ may range or vary from 0 to 1 and the value of coefficient $\beta_1$ may range or vary from –1 to 1. In one example, the sum of the absolute values of $\alpha_1$ and $\beta_1$ may be further constrained to be between 0 and 1.

In zones one and four, the value of $\alpha_1$ is 0 and the value of $\beta_1$ may range in value from 0 to positive 1. In zones two and three, the value of $\alpha_1$ is 0 and the value of $\beta_1$ may range in value from 0 to negative 1. In zone nine, the clutch torque prediction or estimate is blended from a positive clutch torque capacity on the right side of zone nine to engine torque on the left side of zone nine. For example, if clutch operation moves from 450 to 452, then a $\alpha_1$ value of 0 and a $\beta_1$ value of 1 at 450 may be adjusted to a $\alpha_1$ value of 1 and a $\beta_1$ value of 0 at 452. In zone eight, the clutch torque prediction or estimate is blended from a negative clutch torque capacity on the left side of zone eight to engine torque on the right side of zone eight. For example, if clutch operation moves from 455 to 457, then a $\alpha_1$ value of 0 and a $\beta_1$ value of −1 at 455 may be adjusted to a $\alpha_1$ value of 1 and a $\beta_1$ value of 0 at 457. In zone five, the clutch torque prediction or estimate is blended from a negative clutch torque capacity on the left side of zone five to positive clutch torque capacity on the right side of zone five. For example, if clutch operation moves from 460 to 462, then a $\alpha_1$ value of 0 and a $\beta_1$ value of −1 at 460 may be adjusted to a $\alpha_1$ value of 0 and a $\beta_1$ value of 1 at 462. In zone six, the clutch torque prediction or estimate is blended from a negative clutch torque capacity on the left side of zone six to engine torque on the right side of zone six. For example, if clutch operation moves from 465 to 467, then a $\alpha_1$ value of 0 and a $\beta_1$ value of −0.8 at 465 may be adjusted to a $\alpha_1$ value of 0 and a $\beta_1$ value of −1 at 467. If clutch operation moves from 470 to 472, then a $\alpha_1$ value of 0.98 and a $\beta_1$ value of −0.02 at 470 may be adjusted to a $\alpha_1$ value of 0.6 and a $\beta_1$ value of −0.4 at 472. In zone seven, the clutch torque prediction or estimate is blended from positive driveline disconnect clutch capacity on the bottom side of zone seven to engine torque on the top side of zone seven. For example, if clutch operation moves from 475 to 476, then a $\alpha_1$ value of 0 and a $\beta_1$ value of 1 at 475 may be adjusted to a $\alpha_1$ value of 1 and a $\beta_1$ value of 0 at 476.

In this way, weighting factors $\alpha_1$ and $\beta_1$ may be adjusted responsive to the zone in which the driveline disconnect clutch is operating. The weighting factors may be multiplied with driveline disconnect clutch capacity and engine torque as discussed in the description of method 700.

Referring now to FIG. 5, a plot of example driveline disconnect clutch torque prediction sequences is shown. The sequence of FIG. 5 may be provided via the system of FIGS. 1 and 2 in cooperation with the method of FIG. 7. The plots of FIG. 5 are time aligned and they occur at the same time. Vertical lines at time t0-t5 are times of interest in the sequence.

The first plot of FIG. 5 is a plot of speed of selected driveline components versus time. The vertical axis represents speed and speed increases in the direction of the vertical axis arrow. The horizontal axis represents time and time increases from the left side of the figure to the right side of the figure. Curve 502 represents torque converter impeller speed. Curve 506 represents torque converter turbine speed. Curve 504 represents engine speed.

The second plot of FIG. 5 is a plot of driver demand torque versus time. The vertical axis represents driver demand torque and driver demand torque increases in the direction of the vertical axis arrow. Trace 508 represents driver demand torque. Driver demand torque may be determined via accelerator pedal and vehicle speed. Alternatively, driver demand torque may be provided via an autonomous vehicle controller. The horizontal axis represents time and time increases from the left side of the figure to the right side of the figure.

The third plot of FIG. 5 is a plot of desired torque converter impeller torque versus time. The vertical axis represents desired torque converter impeller torque and desired torque converter impeller torque increases in the direction of the vertical axis arrow. Trace 510 represents desired torque converter impeller torque. The horizontal axis represents time and time increases from the left side of the figure to the right side of the figure.

The fourth plot of FIG. 5 is a plot of engine torque versus time. The vertical axis represents engine torque and engine torque increases in the direction of the vertical axis arrow. Trace 512 represents engine torque. The horizontal axis represents time and time increases from the left side of the figure to the right side of the figure.

The fifth plot of FIG. 5 is a plot of electric machine torque versus time. The vertical axis represents electric machine torque and electric machine torque increases in the direction of the vertical axis arrow. Trace 514 represents electric machine torque. The horizontal axis represents time and time increases from the left side of the figure to the right side of the figure.

The sixth plot of FIG. 5 is a plot of driveline disconnect clutch (K0) torque capacity versus time. The vertical axis represents driveline disconnect clutch torque capacity and driveline disconnect clutch torque capacity increases in the direction of the vertical axis arrow. Trace 516 represents driveline disconnect clutch torque capacity. The horizontal axis represents time and time increases from the left side of the figure to the right side of the figure.

The seventh plot of FIG. 5 is a plot of predicted driveline disconnect clutch torque versus time. The vertical axis represents predicted driveline disconnect clutch torque and predicted driveline disconnect clutch torque increases in the direction of the vertical axis arrow. Trace 518 represents predicted driveline disconnect clutch torque. The horizontal axis represents time and time increases from the left side of the figure to the right side of the figure.

The eighth plot of FIG. 5 is a plot of actual driveline disconnect clutch (KO) torque versus time. The vertical axis represents actual driveline disconnect clutch torque and actual driveline disconnect clutch torque increases in the direction of the vertical axis arrow. Trace 520 represents actual driveline disconnect clutch torque. The horizontal axis represents time and time increases from the left side of the figure to the right side of the figure.

FIG. 5 shows an example engine ramp starting sequence similar to engine starting sequence described by driveline disconnect clutch trajectory 302 shown in FIG. 3. At time t0, the engine speed is zero and the torque converter impeller speed and the torque converter turbine speed are equal and at a middle level. Driver demand torque is low and desired torque converter impeller torque is low. Engine torque is zero and electric machine torque is providing the driver demand torque. The driveline disconnect clutch torque capacity is zero and the predicted driveline disconnect clutch torque is zero. The actual driveline disconnect clutch is also zero. Such conditions may be present when the electric machine is propelling the vehicle. Between time t0 and time t1, just before time t1, the driver demand torque is increased and the desired torque converter impeller torque increases to match the driver demand torque. All other conditions remain near their previous states.

At time t1, an engine start request is made and the torque converter clutch begins to be released (not shown), which allows the torque converter impeller speed to diverge from the torque converter turbine speed. The electric machine torque is increased in response to the driver demand torque increasing. The driveline disconnect clutch torque capacity is zero, the predicted driveline disconnect clutch torque is zero, and the actual driveline disconnect clutch torque is also zero.

Between time t1 and time t2, the engine speed begins to increase in response to the engine start request. The driver demand torque and desired torque converter impeller torque continue to increase. Engine torque is zero and the electric machine torque continues to increase in response to the increasing driver demand torque. The driveline disconnect clutch torque capacity is zero, the predicted driveline disconnect clutch torque is zero, and the actual driveline disconnect clutch torque is also zero.

At time t2, the torque converter clutch is fully unlocked (not shown) and the engine begins to produce torque via combusting air and fuel. The engine speed begins to increase and the driver demand and the desired torque converter impeller torque continue to increase. The electric machine torque continues to increase and the driveline disconnect clutch torque capacity is zero. The predicted driveline disconnect clutch torque and the actual driveline torque remain at zero.

Between time t2 and time t3, the driveline disconnect clutch begins to close so that the driveline disconnect clutch torque capacity increases. The predicted driveline disconnect clutch torque and the actual driveline disconnect clutch torque are negative since electric machine speed is greater than engine speed and the electric machine is accelerating the engine. Electric machine torque is increased to accelerate the engine and maintain vehicle speed. The engine torque changes by a small amount and the driver demand torque levels off at a constant level. The desired torque converter impeller torque also levels off at a constant torque, but it is less than the driver demand torque. The torque converter impeller speed increased to a speed that is greater than the torque converter turbine speed.

At time t3, a request to lock the driveline disconnect clutch is issued. The driveline disconnect torque capacity begins to increase further shortly thereafter and the magnitude of the predicted driveline disconnect clutch torque and the actual driveline disconnect clutch torque continues to increase. The electric machine torque further increases to compensate for accelerating the engine via closing the driveline disconnect clutch. Engine speed accelerates toward torque converter impeller speed and driver demand torque remains constant.

Between time t3 and time t4, driveline disconnect clutch torque capacity exceeds engine torque and the predicted driveline disconnect clutch torque is begins to be smoothly transitioned to engine torque. The actual driveline disconnect clutch torque continues in a negative direction and the electric machine torque begins to be reduced. The driver demand torque remains constant and the desired torque converter impeller torque remains at its previous value.

At time t4, the driveline disconnect clutch locks. Shortly thereafter, the engine torque increases and the predicted driveline disconnect clutch torque increases as engine torque increases. Further, actual driveline disconnect clutch torque increases as engine torque increases. The desired torque converter impeller torque is also increased in response to the driveline disconnect clutch being locked. The driver demand torque remains constant and the engine speed matches the torque converter impeller speed. The driveline disconnect clutch torque capacity reaches a maximum value between time t4 and time t5.

At time t5, the desired torque converter impeller torque and engine torque match the driver demand torque. The predicted driveline disconnect clutch torque and the actual driveline disconnect clutch torque match the driver demand torque at time t5.

In this way, the predicted driveline disconnect clutch torque may be estimated to lead (e.g., reach a value before the actual driveline disconnect clutch reaches the same value) the actual driveline disconnect clutch torque so that electric machine torque and engine torque may be adjusted to reduce driveline torque disturbances.

Referring now to FIG. 6, the same plots and traces shown in FIG. 5 are shown in FIG. 6. Therefore, for the sake of brevity the description of the plots and traces is omitted here, except the numbered traces are described for clarity.

In this example, trace 602 represents torque converter impeller speed. Trace 606 represents torque converter turbine speed. Trace 604 represents engine speed. Trace 608 represents driver demand torque. Trace 610 represents desired torque converter impeller torque. Trace 612 represents engine torque. Trace 614 represents electric machine torque. Trace 616 represents driveline disconnect clutch torque capacity. Trace 618 represents predicted driveline disconnect clutch torque. Trace 620 represents actual driveline disconnect clutch torque.

FIG. 6 shows an example engine ramp starting sequence similar to engine starting sequence described by driveline disconnect clutch trajectory 304 shown in FIG. 3. At time t10, the engine speed is zero and the torque converter impeller speed and the torque converter turbine speed are equal and at a middle level. Driver demand torque is low and desired torque converter impeller torque is low. Engine torque is zero and electric machine torque is providing the driver demand torque. The driveline disconnect clutch torque capacity is zero and the predicted driveline disconnect clutch torque is zero. The actual driveline disconnect clutch is also zero. Such conditions may be present when the electric machine is propelling the vehicle. Between time t10 and time t11, just before time t11, the driver demand torque is increased and the desired torque converter impeller torque increases to match the driver demand torque. All other conditions remain near their previous states.

At time t11, an engine start request is made and the torque converter clutch begins to be released (not shown), which allows the torque converter impeller speed to diverge from the torque converter turbine speed. The electric machine torque is increased in response to the driver demand torque increasing. The driveline disconnect clutch torque capacity is zero, the predicted driveline disconnect clutch torque is zero, and the actual driveline disconnect clutch torque is also zero.

Between time t11 and time t12, the engine speed begins to increase in response to the engine start request. The driver demand torque and desired torque converter impeller torque continue to increase. Engine torque is zero and the electric machine torque continues to increase in response to the increasing driver demand torque. The driveline disconnect clutch torque capacity is zero, the predicted driveline disconnect clutch torque is zero, and the actual driveline disconnect clutch torque is also zero.

At time t12, the torque converter clutch is fully unlocked (not shown) and the engine begins to produce torque via combusting air and fuel. The engine speed begins to increase and the driver demand and the desired torque converter impeller torque continue to increase. The electric machine torque continues to increase and the driveline disconnect clutch torque capacity is zero. The predicted driveline disconnect clutch torque and the actual driveline torque remain at zero.

Between time t12 and time t13, the driveline disconnect clutch begins to close so that the driveline disconnect clutch torque capacity increases. The predicted driveline disconnect clutch torque and the actual driveline disconnect clutch torque are negative since electric machine speed is greater than engine speed and the electric machine is accelerating the engine. Electric machine torque is increased to accelerate the engine and maintain vehicle speed. The engine torque is lowered by a small amount and the driver demand torque levels off at a constant level. The desired torque converter impeller torque also levels off at a constant torque, but it is less than the driver demand torque. The torque converter impeller speed increased to a speed that is greater than the torque converter turbine speed.

At time t13, a request to lock the driveline disconnect clutch is issued. The driveline disconnect torque capacity begins to increase further shortly thereafter and the magnitude of the predicted driveline disconnect clutch torque and the actual driveline disconnect clutch torque continues to increase. The electric machine torque further increases shortly thereafter to compensate for accelerating the engine via closing the driveline disconnect clutch. Engine speed accelerates toward torque converter impeller speed and driver demand torque remains constant.

Between time t13 and time t14, engine speed approaches torque converter impeller speed. The predicted driveline disconnect clutch torque is blended from minus driveline disconnect clutch torque capacity to positive driveline disconnect clutch torque capacity because the driveline disconnect clutch torque capacity is well below engine torque. As driveline disconnect clutch torque capacity continues to increase, driveline disconnect clutch slip decreases, thereby causing the driveline disconnect clutch torque to be estimated by blending from driveline disconnect clutch torque capacity to engine torque. The actual driveline disconnect clutch torque continues in a negative direction and the electric machine torque begins to be reduced. The driver demand torque remains constant and the desired torque converter impeller torque remains at its previous value.

At time t14, the driveline disconnect clutch locks. Shortly thereafter, the engine torque increases and the predicted driveline disconnect clutch torque increases as engine torque increases. Further, actual driveline disconnect clutch torque increases as engine torque increases. The desired torque converter impeller torque is also increased in response to the driveline disconnect clutch being locked. The driver demand torque remains constant and the engine speed matches the torque converter impeller speed. The driveline disconnect clutch torque capacity continues to increase and it reaches a maximum value near time t15.

Referring now to FIG. 7, a flowchart for operating a hybrid vehicle is shown. At least portions of the method of FIG. 7 may be incorporated as executable instructions stored in non-transitory memory of the system shown in FIGS. 1 and 2. Additionally, portions of the method of FIG. 7 may take place in the physical world as operations or actions performed by a controller to transform an operating state of one or more devices. Some of the control parameters described herein may be determined via receiving input from the sensors and actuators described previously. The method of FIG. 7 may also provide the operating sequence shown in FIGS. 5 and 6.

At 702, method 400 determines engine speed (N) and torque converter impeller speed (TN) via sensor input to the controller. In one example, engine speed and torque converter impeller speed may be determined via measuring a time interval between teeth of a gear wheel. Method 700 proceeds to 704 after engine speed and torque converter impeller speed are determined.

At 704, method 700 estimates driveline disconnect clutch torque capacity. The driveline disconnect clutch torque capacity is an amount of torque the driveline disconnect clutch may transfer without slip or with less than a predetermined amount of slip (e.g., slip of less than 50 RPM). In one example, method 700 may estimate driveline disconnect clutch torque capacity (CP) as a function of force applied to close the driveline disconnect clutch (x). The function may be referenced via force x and values in the function may be empirically determined. Alternatively, driveline disconnect clutch torque capacity (CP) may be determined as a function of driveline disconnect clutch position. Method 700 proceeds to 706.

At 706, method 700 estimates net engine torque (e.g., engine torque produced at the engine crankshaft minus torque to drive accessories (alternator, power steering, etc.) coupled to the engine). In one example, the net engine torque (ETOR) may be estimated as a function (f) of engine air flow (AIR), engine speed (N), and engine fuel flow (FUEL). The function may be referenced via engine speed, engine air flow, and engine fuel flow. The function may be populated via empirically determined data and the function outputs an engine torque value. In some examples, the engine torque value may be further adjusted responsive to spark timing. For example, engine torque may be adjusted responsive to the engine's present spark timing relative to minimum spark timing for best torque (MBT). Thus, if the engine's present spark timing is retarded from MBT spark timing, the engine net torque estimate may be reduced as a function of spark timing retarded from MBT spark timing. Method 700 proceeds to 708.

At 708, method 700 estimates driveline disconnect clutch slip and an amount of driveline disconnect clutch excess torque capacity. In one example, the driveline disconnect clutch slip is determined via the following equation:

$$DC_{slip} = N - TN$$

where $DC_{slip}$ is driveline disconnect clutch slip, N is engine speed, and TN is torque converter impeller speed. Driveline disconnect clutch excess torque capacity may be determined via the following equation:

$$DC\_ET = CP - ETOR$$

where DC_ET is driveline disconnect clutch excess torque, CP is driveline disconnect clutch torque capacity, and ETOR is net engine torque. Method 700 proceeds to 710.

At 710, method 700 determines the engine torque weighting coefficient $\alpha_1$ and the driveline disconnect clutch torque capacity weighting coefficient $\beta_1$. In one example, the coefficients may be determined via the following equations:

$$\alpha_1 = f1(DC\_ET, DC_{slip})$$

$$\beta_1 = f2(DC\_ET, DC_{slip})$$

where f1 is a function or table of empirically determined values of $\alpha_1$ that may be in a range of 0 to one, f2 is a function or table of empirically determined values of $\beta_1$ that may be in a range of −1 to 1, DC_ET is driveline disconnect clutch excess torque, and $DC_{slip}$ is driveline disconnect clutch slip. Method 700 proceeds to 712.

At 712, method 700 determines a predicted driveline disconnect clutch torque. In one example, the predicted driveline disconnect clutch torque may be determined via the following equation:

$$DC_{predict} = (\alpha_1 \cdot ETOR) + (\beta_1 \cdot CP)$$

where $DC_{predict}$ is the predicted driveline disconnect clutch torque, cu is the engine torque weighting coefficient, $\beta_1$ is the driveline disconnect clutch torque capacity weighting coefficient, ETOR is the present net engine torque, and CP is the present driveline disconnect clutch torque capacity. The value of $DC_{predict}$ may be broadcast to one or more controllers in the vehicle via CAN so that driveline torque actuators may be adjusted responsive to the value of $DC_{predict}$. Method 700 proceeds to 714.

At 714, method 700 adjusts an driveline torque actuator responsive to the value of $DC_{predict}$. In one example, electric machine torque is adjusted responsive to $DC_{predict}$ such that driveline torque may be maintained substantially constant (e.g., vary by less than 10 percent) during engine starting. Further, engine torque may be adjusted via adjusting throttle position, fuel injection timing, spark timing, cam timing, or other torque actuators such that driveline torque follows a desired trajectory. For example, if the predicted driveline disconnect clutch torque magnitude is increasing and the predicted driveline disconnect clutch torque is negative, electric machine torque may be increased in a positive direction to maintain driveline torque, thereby reducing driveline torque disturbances. Method 700 proceeds to exit.

In this way, method 700 may predicted driveline disconnect clutch torque so that driveline torque disturbances due to CAN delays may be mitigated. Further, the predicted driveline disconnect clutch torque may be useful for adjusting engine torque during engine starting and runup.

Thus, the method of FIG. 7 provides for a vehicle operating method, comprising: receiving sensor input to a controller; adjusting a driveline torque actuator responsive to a driveline disconnect clutch torque, the driveline disconnect clutch torque based on engine torque and a driveline disconnect clutch capacity, and where the engine torque is based on the sensor input. The method includes where the driveline disconnect clutch torque capacity is estimated, where the driveline disconnect clutch torque is predicted responsive to the estimated engine torque and the estimated driveline disconnect clutch torque capacity, and where the engine torque is estimated responsive to engine speed, engine air flow, and engine fuel flow. The method includes where the driveline disconnect clutch torque capacity is an amount of torque that the driveline disconnect clutch may mechanically transmit without clutch slip. The method includes where clutch slip is speed of a first side of the driveline disconnect clutch being a threshold speed greater than a second side of the driveline disconnect clutch. The method includes where the driveline torque actuator is an electric machine. The method includes where the driveline torque actuator is an engine throttle. The method includes where the driveline disconnect clutch is positioned in a driveline between an electric machine and an engine.

The method of FIG. 7 also provides for a vehicle operating method, comprising: receiving sensor input to a controller; adjusting a driveline torque actuator responsive to a driveline disconnect clutch torque, the driveline disconnect clutch torque being responsive to operating the driveline disconnect clutch in at least one of a plurality of driveline disconnect clutch torque prediction zones. The method further comprises: estimating engine torque via the sensor input; estimating a driveline disconnect clutch torque capacity; predicting the driveline disconnect clutch torque in further response to the estimated engine torque multiplied with a first weighting factor and the estimate driveline disconnect clutch torque capacity multiplied with a second weighting factor, the first and the second weighting factors dependent on the plurality of driveline disconnect clutch torque prediction zones, and where the first weighting factor is a real number between zero and 1. The method includes where the second weighting factor is a real number between minus one and one. The method further comprises adjusting the first weighting factor and the second weighting factor responsive to the plurality of driveline disconnect clutch torque prediction zones. The method includes where the plurality of driveline disconnect clutch torque prediction zones comprises nine zones. The method further comprises predicting the driveline disconnect clutch torque via adding the estimated engine torque multiplied with the first weighting factor and the estimate driveline disconnect clutch torque capacity multiplied with the second weighting factor. The method includes where the driveline disconnect clutch is positioned in a driveline between an electric machine and an engine, and where the electric machine is positioned upstream of a transmission.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle system, comprising:
    an electric machine;
    an engine;
    a driveline disconnect clutch mechanically coupled to the engine and the electric machine; and
    one or more controllers including executable instructions stored in non-transitory memory to adjust an engine torque actuator responsive to driveline disconnect clutch torque, the driveline disconnect clutch torque based on an engine torque and driveline disconnect clutch torque capacity.

2. The system of claim 1, where the driveline disconnect clutch is positioned in a driveline between the engine and the electric machine.

3. The system of claim 2, further comprising a fixed ratio transmission, the fixed ratio transmission positioned in the driveline downstream of the electric machine.

4. The system of claim 3, further comprising additional instructions to adjusting a first weighting factor and a second weighting factor responsive to a plurality of zones of a driveline disconnect clutch capacity versus driveline disconnect clutch slip map.

5. The system of claim 4, where the plurality of zones includes nine zones.

6. The system of claim 1, where the torque actuator is the electric machine.

7. A vehicle operating method, comprising:
receiving sensor input to a controller;
adjusting a driveline torque actuator responsive to a driveline disconnect clutch torque, the driveline disconnect clutch torque based on engine torque and a driveline disconnect clutch capacity, where the engine torque is based on the sensor input.

8. The method of claim 7, where the driveline disconnect clutch torque capacity is estimated, where the driveline disconnect clutch torque is predicted responsive to the estimated engine torque and the estimated driveline disconnect clutch torque capacity, and where the engine torque is estimated responsive to engine speed, engine air flow, and engine fuel flow.

9. The method of claim 7, where the driveline disconnect clutch torque capacity is an amount of torque that the driveline disconnect clutch may mechanically transmit without clutch slip.

10. The method of claim 9, where clutch slip is speed of a first side of the driveline disconnect clutch being a threshold speed greater than a second side of the driveline disconnect clutch.

11. The method of claim 7, where the driveline torque actuator is an electric machine.

12. The method of claim 7, where the driveline torque actuator is an engine throttle.

13. The method of claim 7, where the driveline disconnect clutch is positioned in a driveline between an electric machine and an engine.

14. A vehicle operating method, comprising:
receiving sensor input to a controller;
adjusting a driveline torque actuator responsive to a driveline disconnect clutch torque, the driveline disconnect clutch torque being responsive to operating the driveline disconnect clutch in at least one of a plurality of driveline disconnect clutch torque prediction zones.

15. The method of claim 14, further comprising:
estimating engine torque via the sensor input;
estimating a driveline disconnect clutch torque capacity;
predicting the driveline disconnect clutch torque in further response to the estimated engine torque multiplied with a first weighting factor and the estimate driveline disconnect clutch torque capacity multiplied with a second weighting factor, the first and the second weighting factors dependent on the plurality of driveline disconnect clutch torque prediction zones, and where the first weighting factor is a real number between zero and 1.

16. The method of claim 15, where the second weighting factor is a real number between minus one and one.

17. The method of claim 14, further comprising adjusting the first weighting factor and the second weighting factor responsive to the plurality of driveline disconnect clutch torque prediction zones.

18. The method of claim 17, where the plurality of driveline disconnect clutch torque prediction zones comprises nine zones.

19. The method of claim 14, further comprising predicting the driveline disconnect clutch torque via adding the estimated engine torque multiplied with the first weighting factor and the estimate driveline disconnect clutch torque capacity multiplied with the second weighting factor.

20. The method of claim 14, where the driveline disconnect clutch is positioned in a driveline between an electric machine and an engine, and where the electric machine is positioned upstream of a transmission.

* * * * *